(12) United States Patent
Wu et al.

(10) Patent No.: US 7,844,946 B2
(45) Date of Patent: Nov. 30, 2010

(54) METHODS AND APPARATUS TO FORM A TRANSACTIONAL OBJECTIVE INSTRUCTION CONSTRUCT FROM LOCK-BASED CRITICAL SECTIONS

(75) Inventors: Youfeng Wu, Palo Alto, CA (US); Cheng Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1068 days.

(21) Appl. No.: 11/535,205

(22) Filed: Sep. 26, 2006

(65) Prior Publication Data

US 2008/0126755 A1 May 29, 2008

(51) Int. Cl.
*G06F 9/44* (2006.01)
*G06F 9/46* (2006.01)

(52) U.S. Cl. ............... 717/119; 717/120; 717/136; 717/149; 718/104; 718/105

(58) Field of Classification Search ............ 717/119, 717/149; 718/104, 105
See application file for complete search history.

(56) References Cited

U.S. PATENT DOCUMENTS

| | | | | |
|---|---|---|---|---|
| 5,584,019 | A * | 12/1996 | Kikuchi et al. | 703/21 |
| 5,835,766 | A * | 11/1998 | Iba et al. | 718/104 |
| 5,845,117 | A * | 12/1998 | Fujita | 718/107 |
| 6,597,907 | B1 * | 7/2003 | Pruitt et al. | 455/423 |
| 6,618,744 | B1 * | 9/2003 | Simmons et al. | 718/104 |
| 2003/0023656 | A1 * | 1/2003 | Hutchison et al. | 709/100 |

OTHER PUBLICATIONS

Lee, Soojung and Junguk L. Kim. "An Efficient Distributed Deadlock Detection Algorithm," Proceedings of the 15th International Conference on distributed Computing Systems, pp. 169-178 (1995).
Lee, Jaehwan and Vincent John Mooney III. "A Novel Deadlock Avoidance Algorithm and Its Hardware Implementation," Georgia Institute of Technology, pp. 200-205 (2004).
Blundell, Colin; E Christopher Lewis; and Milo M.K. Martin. "Deconstructing Transactional Semantics: The Subtleties of Atomicity," University of Pennsylvania, pp. 1-7 (Jun. 2005).
Ananian, C. Scott; Krste Asanovic; Bradley C. Kuszmaul; Charles E. Leiserson; and Sean Lie. "Unbounded Transactional Memory," MIT Computer Science and Artificial Intelligence Laboratory, 12 pages (2005).
Moore, Kevin E.; Jayaram Bobba; Michelle J. Moravan; Mark D. Hill; and David A. Wood. "LogTM: Log-based Transactional Memory," Department of Computer Sciences, University of Wisconsin-Madison, pp. 1-12 (2006).

(Continued)

*Primary Examiner*—Thomas K Pham
(74) *Attorney, Agent, or Firm*—Hanley, Flight & Zimmerman, LLC.

(57) ABSTRACT

Methods and an apparatus for forming a transaction object instruction construct are provided. An example method translates a source instruction construct to form a transactional objective instruction construct, executes the transactional objective instruction construct, intercepts an aborted transaction associated with the transactional objective instruction construct during execution, maintains a graph of nodes and edges associated with the executed transactional objective instruction construct to predict a deadlock situation, and resolves the deadlock situation associated with the transactional objective instruction construct based on the graph.

28 Claims, 8 Drawing Sheets

OTHER PUBLICATIONS

Saha, Bratin; Ali-Reza Adl-Tabatabai; Richard L. Hudson; Chi Cao Mingh; and Benjamin Hertzberg. "McRT-STM: A High Performance Software Transactional Memory System for a Multi-Core Runtime," Intel Corporation and Stanford University, pp. 187-197 (2006).

Adl-Tabatabai, Ali-Reza; Brian T. Lewis; Vijay Menon; Brian R. Murphy; and Bratin Saha. "Compiler and Runtime Support for Efficient Software Transactional Memory," Intel Labs and Intel China Research Center, pp. 26-37 (2006).

* cited by examiner

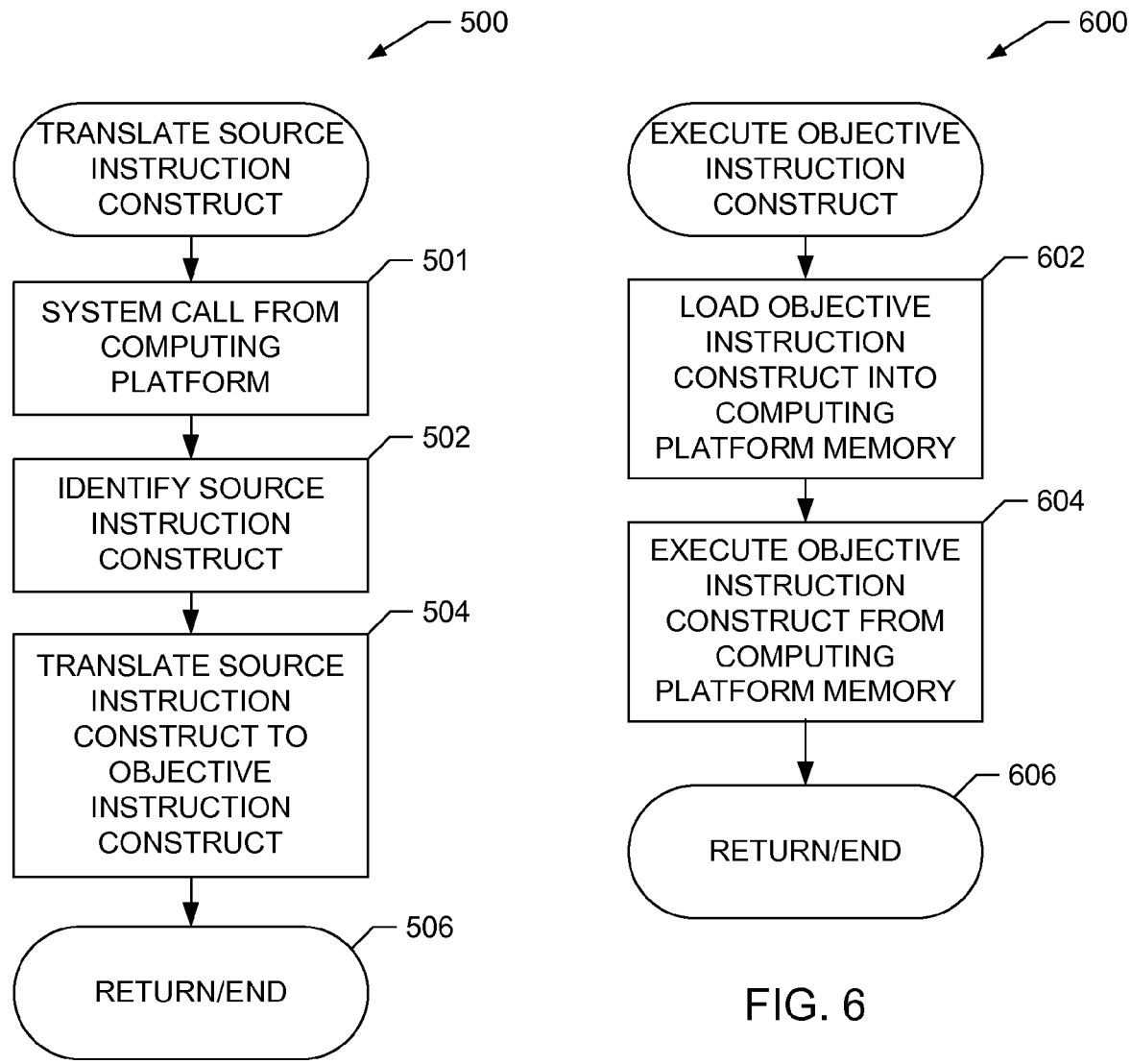

METHODS AND APPARATUS TO FORM A TRANSACTIONAL OBJECTIVE INSTRUCTION CONSTRUCT FROM LOCK-BASED CRITICAL SECTIONS

TECHNICAL FIELD

This disclosure relates generally to program management and, more particularly, to methods and apparatus to translate a source instruction construct to form a transactional objective instruction construct.

BACKGROUND

As many-core computer platforms become more common, providing support for practical parallel programming is becoming more critical. However, as core performance increases, the time spent (i.e., overhead) synchronizing between threads (e.g., tasks, code sequences, processes) becomes a greater portion of execution time. For parallel programming, synchronizing between threads is typically accomplished by using locks. A lock is commonly understood to be a synchronization method for enforcing access limits to resources among and between multiple threads, where threads acquire a lock before accessing a corresponding resource and release the lock after utilizing the resource.

On these many-core computer platforms, executing programs with traditional lock-based synchronization can create well-known problems dependent on the granularity, which is a measure of the amount of data the lock is protecting. With coarse-grained locks, a smaller number of locks, each of which protects a relatively large segment of data, is used. However, coarse-grained locks create issues with overhead because there is a higher likelihood that the lock will stop a parallel thread from proceeding. Alternatively, utilizing fine-grained locks, a larger number of locks with each protecting a relatively small amount of data, introduces increased complexity to avoid deadlock and to guarantee correctness in execution. A deadlock commonly refers to a restrictive state in which threads are blocked forever because of cyclic dependencies.

To address the above-mentioned difficulties with a lock-based instruction construct, a method of transactional memory has been proposed to simplify concurrency management by supporting parallel tasks as transactions, which appear to execute atomically and in isolation. Using transactional memory, programmers can achieve increased parallel performance with identified, coarse-grained transactions. Furthermore, transactions address other challenges of lock-based parallel execution such as deadlocks and robustness to failures.

With transactional memory, programmers define atomic code sequences or transactions, which may include unstructured flow control and any number of memory references. The transactional memory system executes transactions correctly by generally providing: (1) atomicity: either the whole transaction executes or none of it; (2) isolation: partial memory updates are not visible to other transactions; and (3) consistency: there appears to be a single transaction completion order across the whole system. If these provisions are true at the end of its execution, the transaction commits its writes to shared memory. If not, the transaction violates and its writes are rolled back.

For legacy programs that are already implemented with a lock-based instruction construct, there are opportunities to expose more concurrency by converting the lock-based instruction construct to a transactional instruction construct. Therefore, it is desirable to convert the lock-based instruction construct into a transaction instruction construct using a translator. However, it is a challenge to convert these lock-based sections to transactions correctly. With conversions to transactional memory, there is still chance of deadlock among the transactions converted from lock-based sections.

BRIEF DESCRIPTION OF THE DRAWINGS

FIG. 5 is a flow diagram of an example manner in which the process of translating a source instruction construct to a transactional objective instruction construct depicted in FIG. 4 may be implemented.

FIG. 6 is a flow diagram of an example manner in which the process of executing the objective instruction construct depicted in FIG. 4 may be implemented.

DETAILED DESCRIPTION

Figure 1:
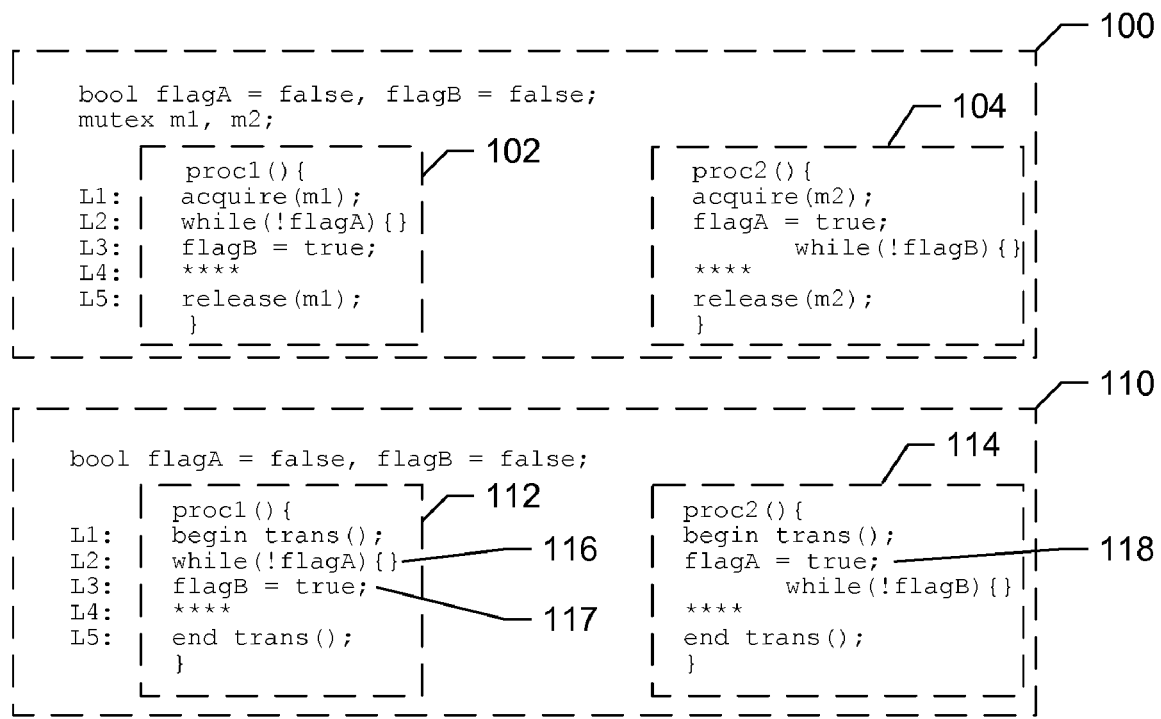
FIG. 1 is a pseudocode example of a source instruction construct and a transactional objective instruction construct.

FIG. 1 is a pseudocode example of a source instruction construct 100 and a transactional objective instruction construct 110 translated from the source instruction construct 100. The translated transactional objective instruction construct 110 has been converted from a lock-based instruction construct of the source instruction construct 100 to a transactional instruction construct. Within the source instruction construct 100, the variables "m1" and "m2" are declared as mutex variables (i.e., mutual exclusion variables, locks, etc.) which, when executed, lock critical sections of code that access shared data. Within the source instruction construct 100, two processes, a first process 102 and a second process 104, are defined as critical sections that respectively acquire (i.e., lock) the "m1" and "m2" variables and release (i.e., unlock) these variables as the associated critical sections of code. To translate the source instruction construct 100 to the transactional objective instruction construct 110, the first process 102 and the second process 104 are converted to a first transaction 112 and a second transaction 114, respectively, based on the sections of code within the locked structure (i.e., the instructions within the acquire and release of the mutex variables).

During an execution sequence of the transactional objective instruction construct 110, the first transaction 112 accesses a Boolean signal 116, and the second transaction 114 modifies the Boolean signal 116. Also, the second transaction 114 accesses the Boolean signal 117, and the first transaction 112 modifies the Boolean signal 117. Thus, one of the transactions 112 of 114 must be aborted to resolve the concurrent conflict access on the Boolean signals 116 and 117. In this example, a deadlock happens without regard to transaction version management and conflict detection implementation. The example deadlock scenario provided in the transactional objective instruction construct 110, as translated from the source instruction construct 100, is provided as one example of an incorrect translation. Persons of skill in the art will readily identify many variations of incorrect translations of lock-based instruction constructs to transactional instruction constructs (see, for example, Blundell, et al. Deconstructing transactional semantics: The subtleties of atomicity. In *Workshop on Duplicating, Deconstructing, and Debunking*, June 2005.)

At any instant during an execution of multiple processes, a graph of the processes (i.e., continuous regions of respective code) can be created, where each process is represented as a graph node, and each edge represents or models waiting simulations or aborted processes. For example, if a process $T_1$ is aborted because of a conflicting process $T_2$, then there is an edge $T_1 \leftarrow T_2$ that represents that $T_1$ is waiting for $T_2$. More generally, an edge $T_i \leftarrow T_j$ is created whenever a process $T_i$ is aborted by process $T_j$, and the edge is deleted when one of the transactions are committed. When concurrent conflict access happens repeatedly between two transactions, the transaction contention manager may attempt to minimize the possibility of deadlocks by alternative aborts of either one of the transactions. For example, if a first transaction is repeatedly aborted by a second transaction, the runtime may force second transaction to abort. Thus, in some cases, the possible deadlock is avoided. Therefore, a dead lock happens only when there is a cycle in the graph. The graph can be utilized to detect deadlock whenever the graph has a cycle or cyclic dependency in which a sequence of edges loops back on itself, such as $T_1 \leftarrow T_2 \leftarrow T_3 \leftarrow T_1$ or $T_i \leftarrow T_j \leftarrow \ldots \leftarrow T_i$.

Figure 2:
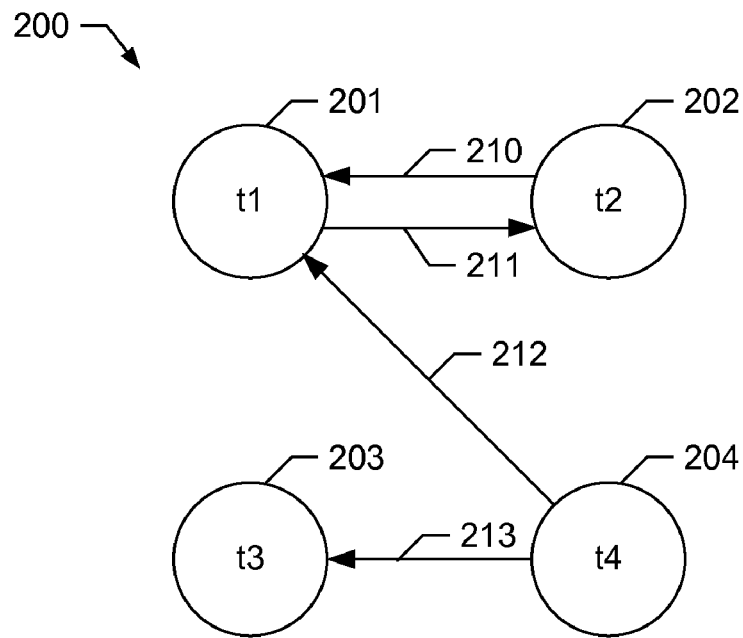
FIG. 2 is an illustrative example of a graph having a cyclic dependency.

FIG. 2 provides an example illustrative representation of a graph 200. Within the graph 200, each of four nodes 201, 202, 203, and 204 represents a respective process. Also within the graph 200, four edges 210, 211, 212, and 213 are represented, each of which illustrates an aborting relationship between processes. For example, the edge 210 demonstrates that the process represented by the node 201 is being aborted by the process represented by the node 202. Similarly, the edge 211 demonstrates the process represented by the node 202 is being aborted by the process represented by the node 201. Within the graph 200, a cycle or cyclic dependency is created by the edges 210 and 211 and, thus, the processes represented by the node 201 and the node 202 are subject to a circular abort or deadlock condition.

Figure 3:
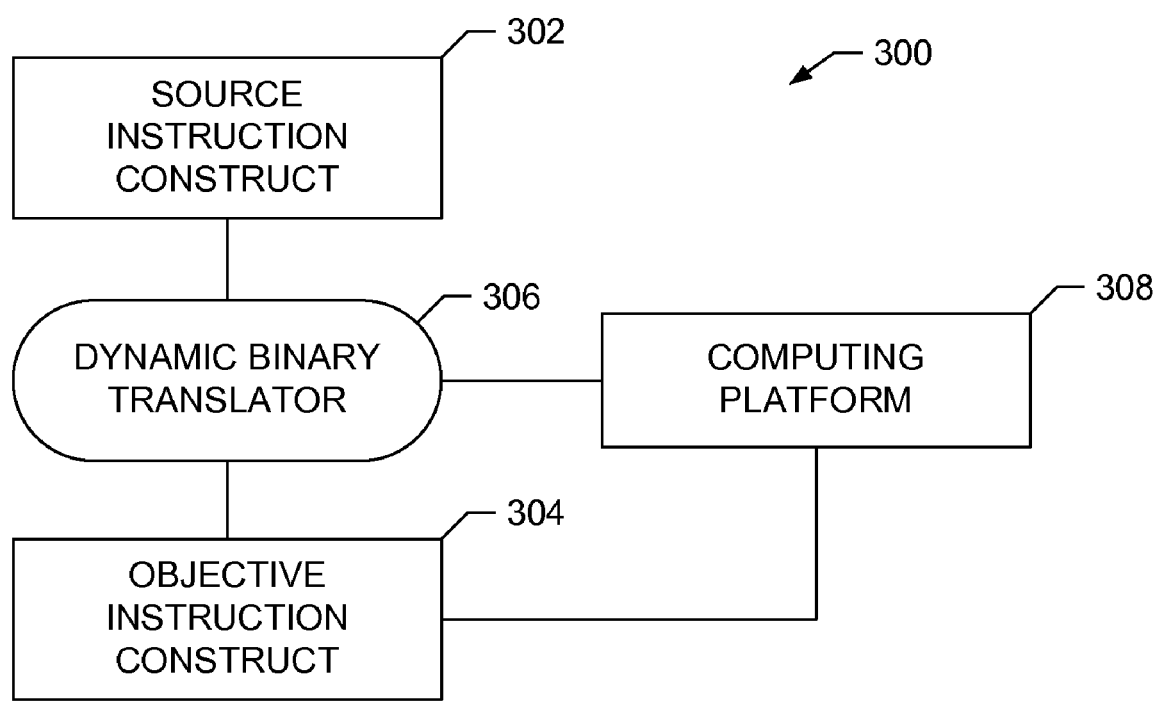
FIG. 3 is a schematic example of a dynamic binary translator and its interfaces.

FIG. 3 is a schematic illustration of an example apparatus 300 used to translate a source instruction construct 302 to a transactional objective instruction construct 304 utilizing a dynamic binary translator 306 and a computing platform 308. In the illustrated example, the source instruction construct 302 demonstrates an existing instruction construct that may be composed using high-level languages (i.e., constructs understood by a programmer) or low-level languages (i.e., machine code, binary code, assembly code etc.), which may contain a lock-based instruction construct. The transactional objective instruction construct 304 represents an instruction construct that is constructed by the dynamic binary translator 306, which can be executed by the computing platform 308. The computing platform 308 represents a computing architecture including, for example, one or more processors with on-processor cache memory, main memories, mass storage devices, and input devices.

Figure 4:
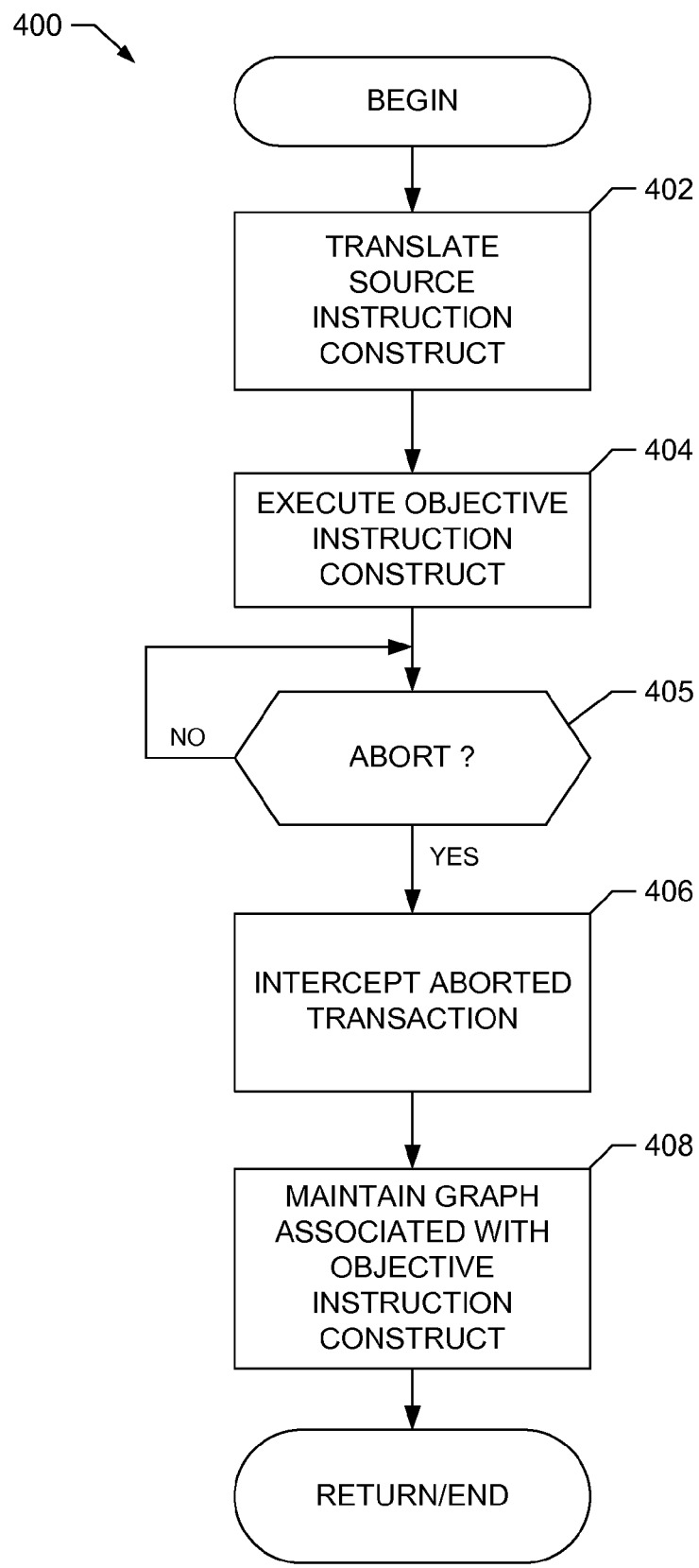
FIG. 4 is a flow diagram of an example of a process that may be performed by the example binary translator and its interfaces of FIG. 3.

FIG. 4 is an example flow diagram of an example process 400 that may be performed by the dynamic binary translator 306. To correctly translate the source instruction 302 construct to the transactional objective instruction construct 304, the dynamic binary translator 306 translates the source instruction construct 302 to a first translated transactional objective instruction construct 304 (block 402). After the source instruction construct 302 is translated (block 402), the dynamic binary translator 306 supports execution of the transactional objective instruction construct 304 (block 404). If the transactional objective instruction construct 304 detects conflict between transactions, the transactional objective instruction construction 304 resolves the conflict by aborting a transaction (block 405). If the transaction objective instruction construct 304 aborts a transaction in block 405, the dynamic binary translator 306 then intercepts the aborted transaction associated with the executed transactional objective instruction construct 304 (block 406). Also, the dynamic binary translator 306 maintains a graph associated with the transactional objective instruction construct 304 (block 408) to predict a deadlock situation and resolve a predicted deadlock situation.

The example process 400 may be iterated zero-to-many times using, for example, the example apparatus 300. Iterating the example process 400 optimizes the translated example transactional objective instruction construct 304 for execution by identifying (block 406) sections of the source instruction construct 302 that cannot be translated from lock-based to transactional instruction constructs. Additionally, the example process 400 minimizes the time spent in a deadlock situation when the example computing platform 308 executes the example transactional objective instruction construct 304.

FIG. 5 is a flow diagram of an example process 500 for translating the source instruction construct 302 to the transactional objective instruction construct 304 (block 402 of FIG. 4). The example process 500 begins by the dynamic binary translator 306 responding to a system call from the computing platform 308, such as operating system call-back, exception, and/or code self-modification (block 501). After the responding to the system call (block 501), the dynamic binary translator 306 identifies the source instruction construct 302 (block 502). In identifying the source instruction construct 302 (block 502), the dynamic binary translator 306 differentiates a lock-based instruction construct within the source instruction construct 302. For example, the source instruction construct 302 may contain a process constructed with lock instructions, where the process is determined to be atomic.

Following source instruction construct identification at block 502, the dynamic binary translator 306 translates the process within the source instruction construct 302 into a transaction construct to form the transactional objective instruction construct 304 (block 504). Additionally, the dynamic binary translator 306 can identify a first instruction language, which is native to a first type of computing platform, processor, etc. of the source instruction construct 302 and translate the first instruction language to a second instruction language, which is native to a second example type of computing platform, processor, etc. After forming the transactional objective instruction construct 304 (block 504), the transactional objective instruction construct 304 is composed of an instruction language that can be executed by the computing platform 308 (i.e., a language that is native to the computing platform 308). The example process 500 concludes at block 506 and returns to the example process 400 of FIG. 4 to execute the transactional objective instruction construct 304 (block 404).

FIG. 6 is a flow diagram of an example process 600 for executing the transactional objective instruction construct 304 (block 404). The example process 600 executed by the dynamic binary translator 306 begins by loading the transactional objective instruction construct 304 into a memory (e.g., code cache) of the computing platform 308 (block 602). After the transactional objective instruction construct 304 is loaded into memory (block 602), the computing platform 308 executes the transactional objective instruction construct 304 (block 604). After execution commences by the computing platform 308 (block 604), the example process 600 ends and returns to the example process 400 of FIG. 4 to intercept an aborted transaction associated with the executed transactional objective instruction construct 304 (block 406).

Figure 7:
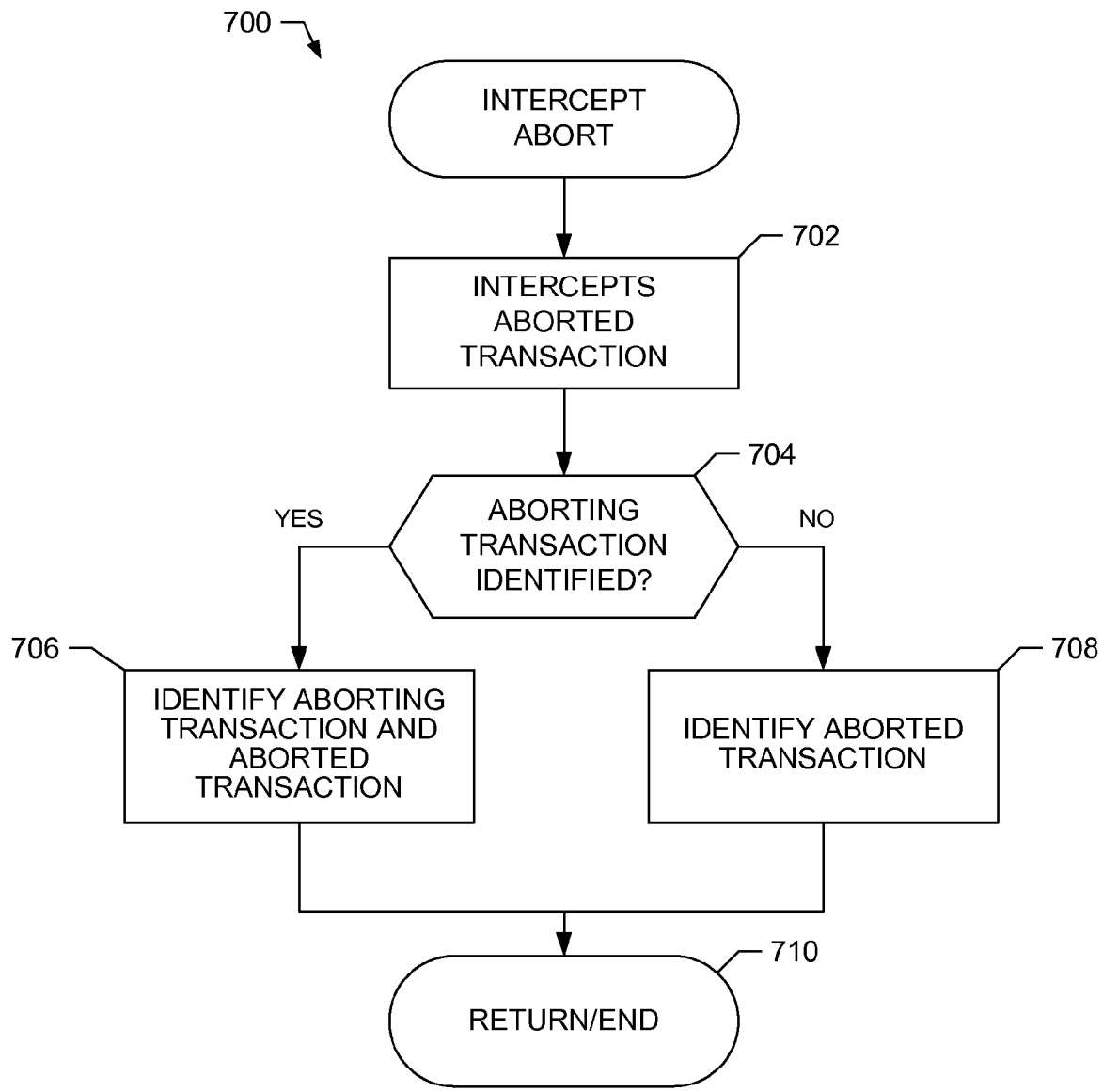
FIG. 7 is a flow diagram of an example manner in which the process of intercepting an aborted transaction associated with the executed transactional objective instruction construct process depicted in FIG. 4 may be implemented.

FIG. 7 is a flow diagram of an example process 700 for intercepting an abort from the executed transactional objective instruction construct 304 (block 406). The dynamic binary translator 306 can detect potential deadlock associated with the transactional objective instruction construct 304 through its interface with the computing platform 308. The basic identification of transactional conflict is well known to persons of ordinary skill in the art (see, for example: Adl-Tabatabai, et al. Compiler and runtime support for efficient software transactional memory. In *Proceedings of the* 2006 *ACM SIGPLAN Conference on Programming Language Design and Implementation*. PLDI '06. ACM Press, New York, N.Y., 26-37; and Saha, et al. McRT-STM: a high performance software transactional memory system for a multicore runtime. In *Proceedings of the Eleventh ACM SIGPLAN Symposium on Principles and Practice of Parallel Programming*. ACM Press, New York, N.Y., 187-197). The example dynamic binary translator 306 intercepts an aborted transaction associated with the transactional objective instruction construct 304 (block 702). After an aborted transaction is generally intercepted (block 702), the dynamic binary translator 306 attempts to identify the aborting transaction in block 704 or, in other words, the transaction that is blocking the aborted transaction. Attempting to identify the aborting transaction (block 704) may include, for example, checking memory access or creating a hash table. Alternatively identifying a transaction that writes to a field of a common object accessed by multiple transactions may be indicative of an aborting transaction. If the aborting transaction is identified (block 704), the example process 700 proceeds to block 706 where the aborting and aborted transactions have been identified. Alternatively, if the aborting transaction is not identified (block 704), the example process 700 proceeds to block 708 where only the aborted transaction is identified. The example process 700 ends at block 710 and returns to the example process 400 of FIG. 4 to maintain the graph associated with the objective (block 408).

Figure 8:
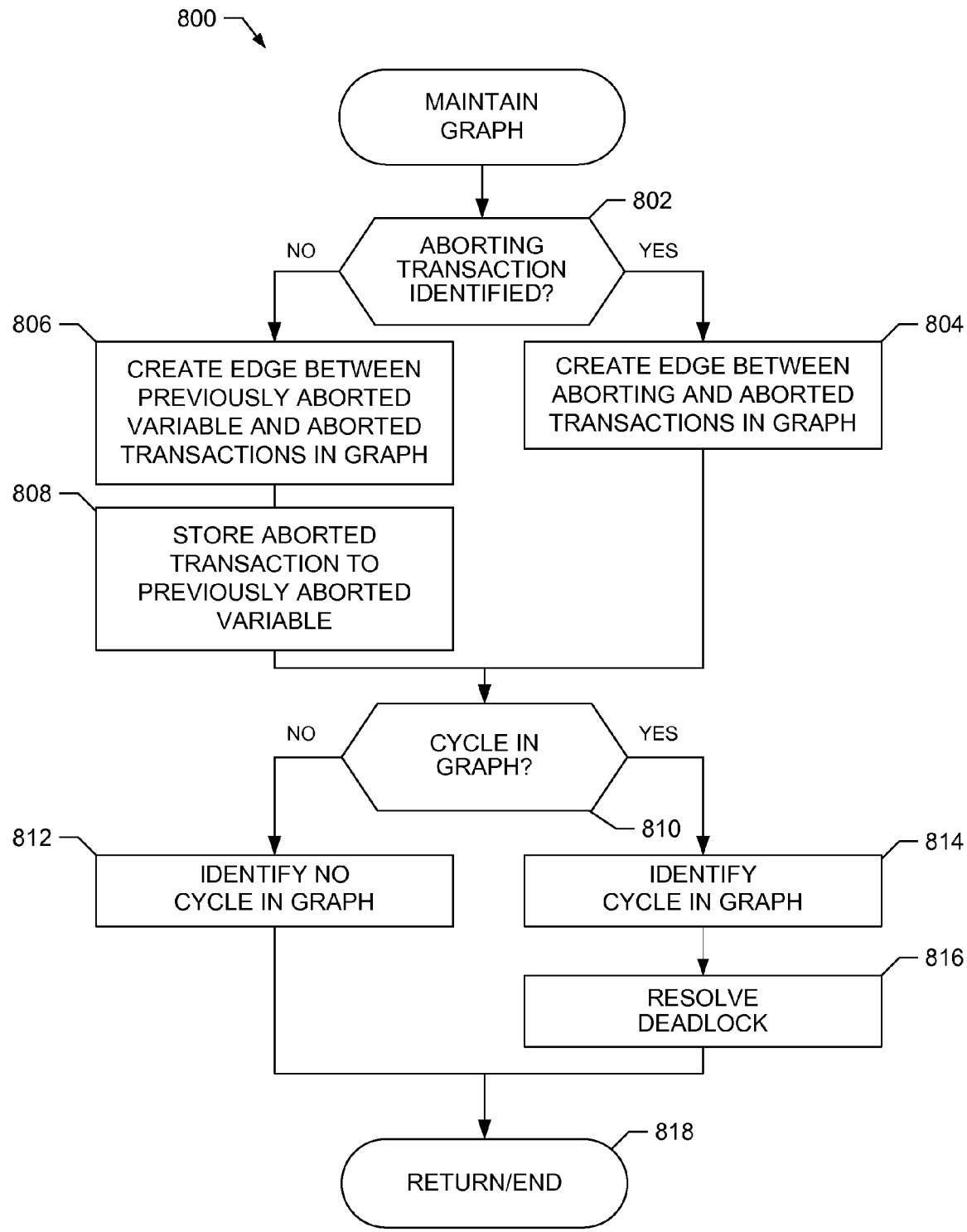
FIG. 8 is a flow diagram of an example manner in which the process of maintaining a graph associated with the executed transactional objective instruction construct depicted in FIG. 4 may be implemented.

As shown previously, graphs can be used to manage interactions between processes. The dynamic binary translator 306 maintains such a graph. The example graph may represent each node as a static transaction. An example process 800 for maintaining a graph is provided in FIG. 8. If in the example process 700 of FIG. 7 the aborting transaction is identified (block 706), the example process 800 proceeds from block 802 to block 804. In block 804, the dynamic binary translator 306 creates an edge between a first node associated with the identified aborting transaction and a second node associated with the aborted transaction. Alternatively, if the aborting transaction is not identified (block 708), the example process 800 proceeds from block 802 to block 806. In block 806, the dynamic binary translator 306 creates an edge between a third node associated with a variable that stores the identity of a previously identified aborted transaction and the second node associated with the identified aborted transaction (e.g., identified at block 706). In this instance, the previously identified aborted transaction and the identified aborted transaction relate to different threads and, therefore, the thread identifiers associated with each thread are recoded. Following the creation of the edge (block 806), the example process 800 proceeds to block 808, where the dynamic binary translator 306 stores the identity of the aborted transaction including the transaction identifier and thread identifier to the variable that stores the identity of the previously identified aborted transaction.

After either creating the edge in the graph (block 804), or updating the variable (block 808), the dynamic binary translator 306 checks the graph for a cycle between the nodes within the graph (block 810). After searching the graph for a cycle (block 810), the dynamic binary translator 306 either proceeds to identify that no cycle exists in the maintained graph in block 812 (i.e., no deadlock exists between transactions), or proceeds to identify that a cycle exists in the maintained graph in block 814 (i.e., deadlock likely exists between transactions). As the method of identifying a cycle in the graph predicts deadlock with approximate certainty, the dynamic binary translator 306 may predict deadlock after a predetermined number of cycles are identified. In such an example, the dynamic binary translator 306 may remove an edge from the graph and increment a counter, which removes the existence of a cycle in the graph, and track the number of identified cycles. If a predetermined number of cycles are detected in the maintained graph in block 814, the dynamic binary translator 306 resolves the predicted deadlock situation (block 816), as discussed below in FIG. 9. Proceeding to block 818, the example process 800 ends and returns to the example process 400 of FIG. 4.

Figure 9:
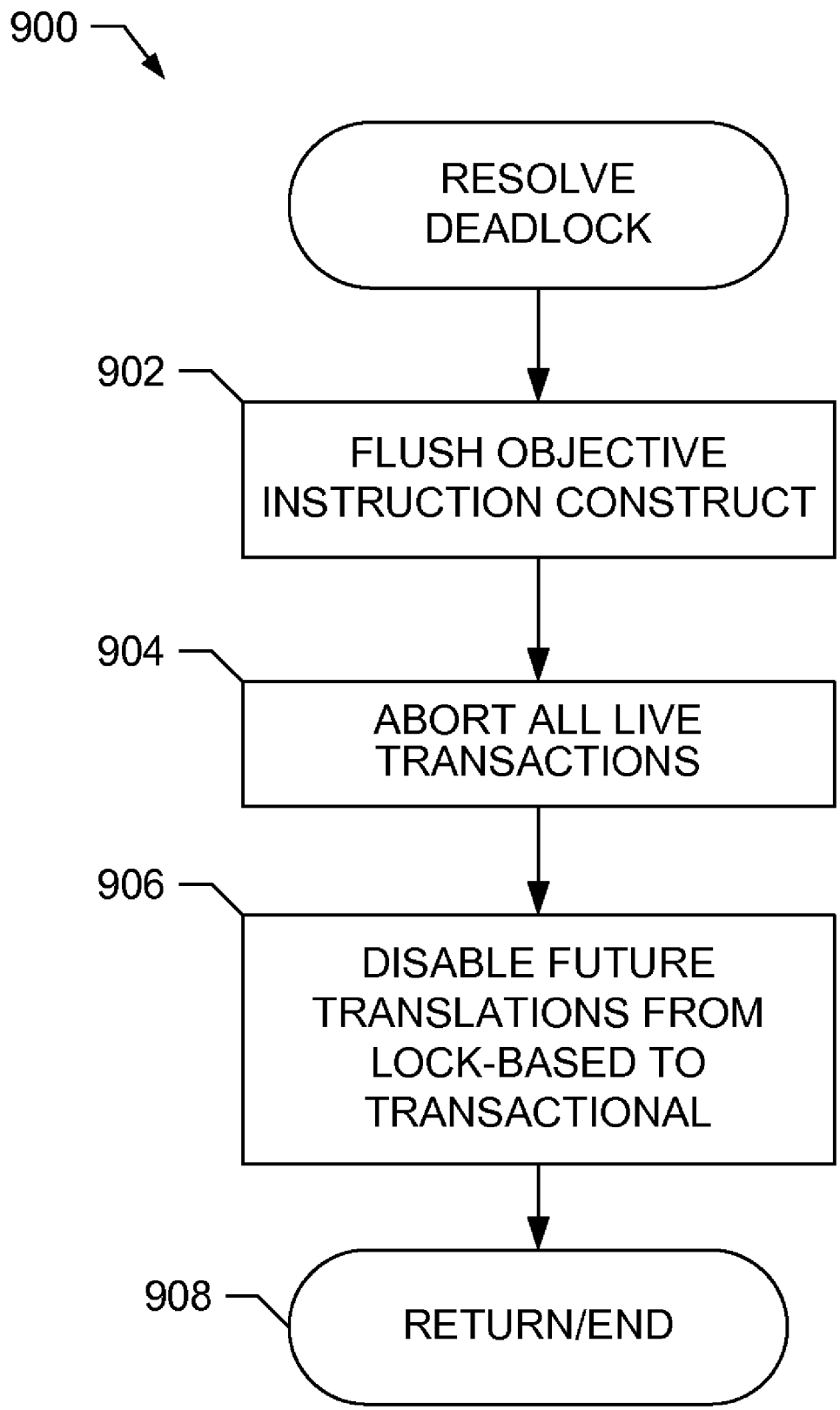
FIG. 9 is a flow diagram of an example manner in which the process of resolving a predicted deadlock situation associated with the executed transactional objective instruction construct depicted in FIG. 8 may be implemented.

FIG. 9 is an example process 900 that may be used to resolve a predicted deadlock situation associated with the transactional objective instruction construct 304 (block 816). The example process 900 begins at block 902, where the dynamic binary translator 306 flushes the transactional objective instruction construct 304 from the memory of the computing platform 308. The example process 900 aborts all live transactions (block 904) and disables future translations associated with the source instruction construct 302 from a lock-based instruction construct to a transactional instruction construct (block 906). At block 908, the example process 900 concludes and returns to the example process 800.

The dynamic binary translator 306 continues interfacing with the computing platform 308 and repeating the example process 400 until the interface between the dynamic binary translator 306 and the computing platform 308 is terminated. Translations of additional source instruction constructs to transactional objective instruction constructs are provided as required by the interface.

Figure 10:
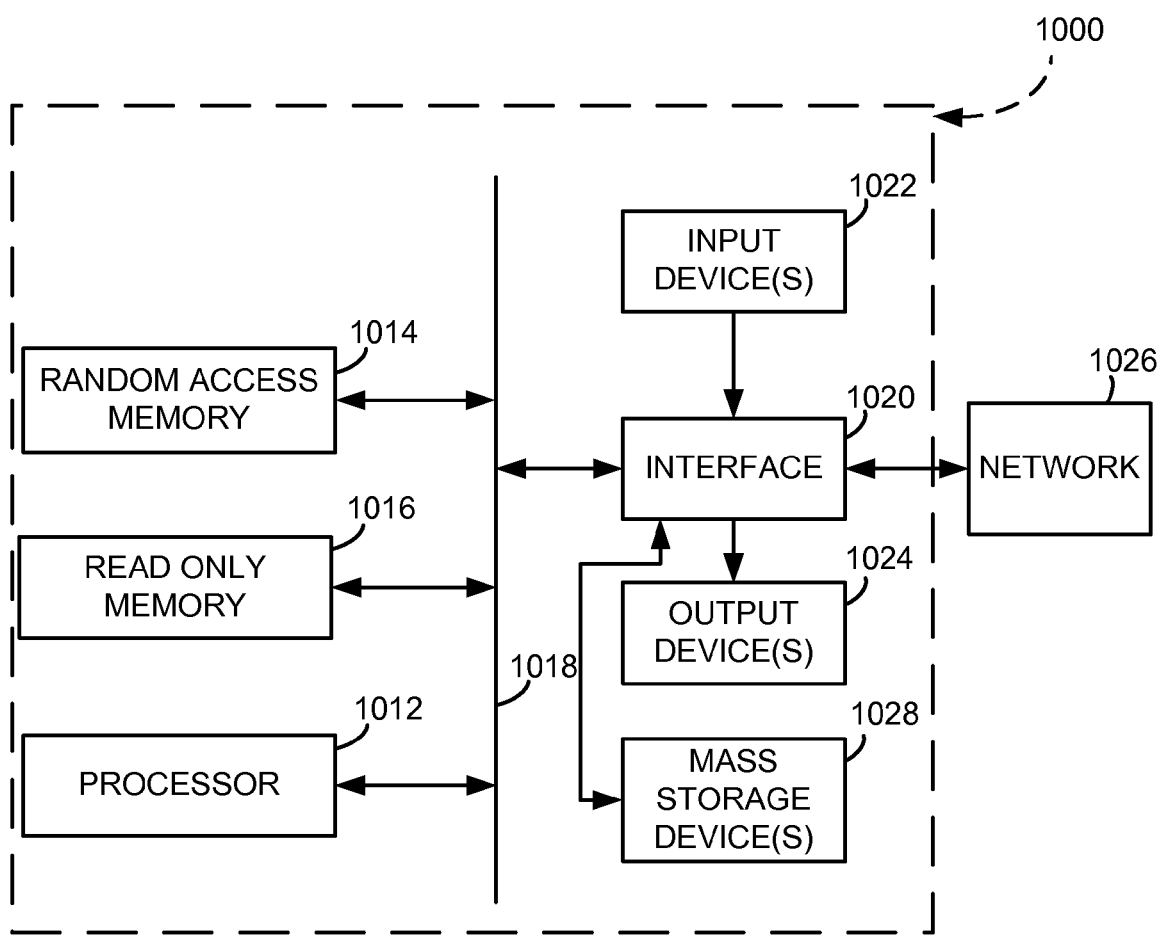
FIG. 10 is a schematic illustration of an example processing system that may be used to implement the methods and apparatus described herein.

FIG. 10 is a block diagram of an example computer 1000 capable of implementing the apparatus and methods disclosed herein. The computer 1000 can be, for example, a server, a personal computer, a personal digital assistant ("PDA"), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family, the XScale® family, or the Centrino™ family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well-known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touch screen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). Thus, the interface circuit 1020 typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage devices 1028 may implement the memory 1014.

As an alternative to implementing the methods and/or apparatus described herein in a system such as the device of FIG. 10, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    translating a source instruction construct to form a first transactional objective instruction construct;
    executing the first transactional objective instruction construct;
    intercepting an aborted transaction associated with the executed first transactional objective instruction construct when a conflict is detected;
    maintaining a graph of nodes and edges associated with the executed first transactional objective instruction construct to predict a deadlock situation;
    resolving the predicted deadlock situation associated with the first transactional objective instruction construct based on the graph; and
    identifying the source instruction construct as a candidate for translation prevention in response to the conflict associated with the first transactional objective instruction construct.

2. A method as defined in claim 1, wherein translating the source instruction construct comprises determining that the source instruction construct has a lock-based instruction construct.

3. A method as defined in claim 1, wherein executing the first transactional objective instruction construct comprises loading the first transactional objective instruction into a computing platform memory and executing the first transactional objective instruction from the computing platform memory.

4. A method as defined in claim 1, wherein intercepting the aborted transaction comprises identifying the aborted transaction.

5. A method as defined in claim 1, wherein intercepting the aborted transaction comprises identifying the aborted transaction and identifying an aborting transaction.

6. A method as defined in claim 1, wherein intercepting the aborted transaction comprises identifying the aborted transaction and storing an identity of the aborted transaction to a variable to identify a previously aborted transaction.

7. A method as defined in claim 1, wherein maintaining the graph of nodes and edges associated with the executed first transactional objective instruction construct comprises creating an edge between a first node associated with an aborting transaction and a second node associated with the aborted transaction in the graph and checking the graph with the edge to identify a cycle to predict the deadlock situation.

8. A method as defined in claim 1, wherein maintaining the graph of nodes and edges associated with the executed first transactional objective instruction construct comprises:
    creating an edge between a first node associated with the aborted transaction and a second node associated with a variable to identify a previously aborted transaction in the graph;
    checking the graph with the edge to identify a cycle to predict the deadlock situation; and
    storing the aborted transaction to the variable to identify the previously aborted transaction.

9. A method as defined in claim 1, wherein resolving the predicted deadlock situation comprises:
    flushing the first transactional objective instruction construct;
    aborting live transactions; and
    disabling future attempts to translate the source instruction construct to form a second transactional objective instruction construct when a predetermined number of cycles in the graph are identified.

10. An article of manufacture storing machine readable instructions which, when executed, cause a machine to:
    translate a source instruction construct to form a first transactional objective instruction construct;
    execute the first transactional objective instruction construct;

intercept an aborted transaction associated with the executed first transactional objective instruction construct when a conflict is detected;

maintain a graph of nodes and edges associated with the executed first transactional objective instruction construct to predict a deadlock situation;

resolve the predicted deadlock situation associated with the first transactional objective instruction construct based on the graph; and identify the source instruction construct as a candidate for translation prevention in response to the conflict associated with the first transactional objective instruction construct.

11. An article of manufacture as defined in claim 10, wherein the machine readable instructions, when executed, cause the machine to translate the source instruction construct by identifying a source instruction construct having a lock-based instruction construct.

12. An article of manufacture as defined in claim 10, wherein the machine readable instructions, when executed, cause the machine to execute the first transactional objective instruction construct by loading the first transactional objective instruction into a computing platform memory and executing the first transactional objective instruction from the computing platform memory.

13. An article of manufacture as defined in claim 10, wherein the machine readable instructions, when executed, cause the machine to intercept the aborted transaction to identify the aborted transaction.

14. An article of manufacture as defined in claim 10, wherein the machine readable instructions, when executed, cause the machine to intercept the aborted transaction to identify the aborted transaction and to identify an aborting transaction.

15. An article of manufacture as defined in claim 10, wherein the machine readable instructions, when executed, cause the machine to intercept the aborted transaction to identify the aborted transaction and to store an identity of the aborted transaction to a variable to identify a previously aborted transaction.

16. An article of manufacture as defined in claim 10, wherein the machine readable instructions, when executed, cause the machine to maintain the graph of nodes and edges associated with the executed first transactional objective instruction construct by creating an edge between a first node associated with an aborting transaction and a second node associated with the aborted transaction in the graph and checking the graph with the edge to identify a cycle to predict the deadlock situation.

17. An article of manufacture as defined in claim 10, wherein the machine readable instructions, when executed, cause the machine to maintain the graph of nodes and edges associated with the executed first transactional objective instruction construct by:

creating an edge between a first node associated with the aborted transaction and a second node associated with a variable to identify a previously aborted transaction in the graph;

checking the graph with the edge to identify a cycle to predict the deadlock situation; and storing the aborted transaction to the variable to identify the previously aborted transaction.

18. An article of manufacture as defined in claim 10, wherein the machine readable instructions, when executed, cause the machine to resolve the predicted deadlock situation by:

flushing the first transactional objective instruction construct;

aborting live transactions; and disabling future attempts to translate the source instruction construct to form a second transactional objective instruction construct when a predetermined number of cycles in the graph are identified.

19. An apparatus comprising:

a computing platform; and a dynamic binary translator coupled to the computing platform to:

translate a source instruction construct to form a first transactional objective instruction construct;

execute the first transactional objective instruction construct;

intercept an aborted transaction associated with the executed first transactional objective instruction construct when a conflict is detected;

maintain a graph of nodes and edges associated with the executed first transactional objective instruction construct to predict a deadlock situation;

resolve the predicted deadlock situation associated with the first transactional objective instruction construct based on the graph; and identify the source instruction construct as a candidate for translation prevention in response to the conflict associated with the first transactional objective instruction construct.

20. An apparatus as defined in claim 19, wherein the dynamic binary translator is to translate the source instruction construct by identifying a source instruction construct having a lock-based instruction construct.

21. An apparatus as defined in claim 19, wherein the dynamic binary translator is to execute the first transactional objective instruction construct by loading the first transactional objective instruction into the computing platform memory associated with the computing platform.

22. An apparatus as defined in claim 21, wherein the computing platform is to execute the loaded first transactional objective instruction from the memory.

23. An apparatus as defined in claim 19, wherein the dynamic binary translator is to intercept the aborted transaction to identify the aborted transaction.

24. An apparatus as defined in claim 19, wherein the dynamic binary translator is to intercept the aborted transaction to identify the aborted transaction and to identify an aborting transaction.

25. An apparatus as defined in claim 19, wherein the dynamic binary translator is to intercept the aborted transaction to identify the aborted transaction and to store the identity of the aborted transaction to a variable to identify a previously aborted transaction.

26. An apparatus as defined in claim 19, wherein the dynamic binary translator is to maintain the graph of nodes and edges associated with the executed first transactional objective instruction construct by creating an edge between a first node associated with an aborting transaction and a second node associated with the aborted transaction in the graph and checking the graph with the edge to identify a cycle to predict the deadlock situation.

27. An apparatus as defined in claim 19, wherein the dynamic binary translator is to maintain the graph of nodes and edges associated with the executed first transactional objective instruction construct by:

creating an edge between a first node associated with the aborted transaction and a second node associated with a variable to identify a previously aborted transaction in the graph;

checking the graph with the edge to identify a cycle to predict the deadlock situation; and storing the aborted transaction to the variable to identify a previously aborted transaction.

28. An apparatus as defined in claim 19, wherein the dynamic binary translator is to resolve the predicted deadlock situation by:

flushing the first transactional objective instruction construct;

aborting live transactions; and disabling future attempts to translate the source instruction construct to a second transactional objective instruction construct when a predetermined number of cycles in the graph are identified.

* * * * *